United States Patent
Qiu et al.

(10) Patent No.: US 9,927,984 B2
(45) Date of Patent: Mar. 27, 2018

(54) ELECTRONIC SYSTEM WITH INTERFACE CONTROL MECHANISM AND METHOD OF OPERATION THEREOF

(71) Applicant: Samsung Electronics Co., Ltd., Suwon-si, Gyeonggi-Do (KR)

(72) Inventors: Sheng Qiu, San Jose, CA (US); Yang Seok Ki, Palo Alto, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 156 days.

(21) Appl. No.: 15/005,497

(22) Filed: Jan. 25, 2016

(65) Prior Publication Data

US 2017/0109041 A1    Apr. 20, 2017

Related U.S. Application Data

(60) Provisional application No. 62/241,499, filed on Oct. 14, 2015.

(51) Int. Cl.
*G06F 3/06* (2006.01)
*G06F 12/06* (2006.01)
*G06F 9/54* (2006.01)

(52) U.S. Cl.
CPC .......... *G06F 3/061* (2013.01); *G06F 3/0607* (2013.01); *G06F 3/0619* (2013.01); *G06F 3/0632* (2013.01); *G06F 3/0659* (2013.01); *G06F 3/0679* (2013.01); *G06F 9/54* (2013.01); *G06F 12/0638* (2013.01); *G06F 2212/205* (2013.01)

(58) Field of Classification Search
CPC ...... G06F 3/061; G06F 3/0619; G06F 3/0607; G06F 3/0632; G06F 3/0638; G06F 3/0659; G06F 3/0679; G06F 12/0638; G06F 2212/205
See application file for complete search history.

(56) References Cited

U.S. PATENT DOCUMENTS

| 7,747,837 | B2 | 6/2010 | Gorobets |
| 8,234,426 | B2 | 7/2012 | Hsu et al. |
| 9,171,643 | B2 | 10/2015 | Lee et al. |
| 9,563,426 | B1* | 2/2017 | Bent ...................... G06F 9/3004 |
| 2013/0086311 | A1 | 4/2013 | Huang et al. |
| 2013/0275656 | A1* | 10/2013 | Talagala .............. G06F 12/0246 711/103 |
| 2014/0304525 | A1 | 10/2014 | Novak et al. |
| 2014/0331001 | A1 | 11/2014 | Liu et al. |

* cited by examiner

*Primary Examiner* — Aracelis Ruiz
(74) *Attorney, Agent, or Firm* — IP Investment Law Group (57) ABSTRACT

An electronic system includes: a storage device, configured to receive an interface command including: an interface control unit, a first CPU, coupled to the interface control unit, configured to execute a logical block address (LBA) command, a second CPU, coupled to the interface control unit, configured to execute a key-value command, and a non-volatile storage, coupled to the volatile memory, the first CPU, and the second CPU configured to process the LBA command and the key-value command independently and concurrently; wherein: the first CPU or the second CPU are configured to compile a detailed status after completing the LBA command or the key-value command; and the interface control unit, connected to a device coupling structure, is configured to respond to the interface command by sending the detailed status to a device driver.

20 Claims, 4 Drawing Sheets

FIG. 4

ELECTRONIC SYSTEM WITH INTERFACE CONTROL MECHANISM AND METHOD OF OPERATION THEREOF

CROSS REFERENCE TO RELATED APPLICATION(S)

This application claims the benefit of U.S. Provisional Patent Application Ser. No. 62/241,499 filed Oct. 14, 2015, and the subject matter thereof is incorporated by reference herein.

TECHNICAL FIELD

An embodiment of the present invention relates generally to an electronic system, and more particularly to a system for data storage functions for electronic systems.

BACKGROUND

Modern solid state disks (SSDs) represent a growing segment to data storage strategies due to their speedy response during data operations. Large numbers of these SSDs can provide data centers with higher capacity, lower power consumption, and higher performance than magnetic disk drives. As the migration to the SSDs gains momentum, a question arises as to why a data block should be limited to 512 bytes. Historically the 512 byte block was a workable size to deal with the reliability issues in magnetic media. Today most operating systems are locked into the fixed block size.

The logistics of manipulating large databases exposes weakness in the technology of the operating systems. While several approaches have been attempted to increase the fixed block size, some storage manufacturers are resorting to concealing the internal data block sizes by running a 512 emulation mode. In doing so they can deal with the inefficiencies of the fixed block interface transfers and hide the use of larger internal data blocks, typically the internal block sizes are 1K to 4 Kbytes. But these strategies involve difficult error recovery processes and small, single block updates must be executed as read-modify-write operations that severely degrade the performance.

Thus, a need still remains for electronic system with interface control mechanism to improve execution reliability and performance in clustered computing environments. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides an electronic system including: a storage device, configured to receive an interface command including: an interface control unit, a first CPU, coupled to the interface control unit, configured to execute a logical block address (LBA) command, a second CPU, coupled to the interface control unit, configured to execute a key-value command, and a non-volatile storage, coupled to the volatile memory, the first CPU, and the second CPU configured to process the LBA command and the key-value command independently and concurrently; wherein: the first CPU or the second CPU are configured to compile a detailed status after completing the LBA command or the key-value command; and the interface control unit, connected to a device coupling structure, is configured to respond to the interface command by sending the detailed status to a device driver.

An embodiment of the present invention provides a method of operation of an electronic system including: receiving an interface command by a storage device including: analyzing the interface command in an interface control unit, selecting a first CPU for executing a logical block address (LBA) command, selecting a second CPU for executing a key-value command, and processing the LBA command and the key-value command independently and concurrently for accessing a non-volatile storage; compiling a detailed status, by the first CPU or the second CPU, after completing the LBA command or the key-value command; and responding to the interface command by sending the detailed status, through a device coupling structure, to a device driver.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Various embodiments provide an interface control mechanism for large databases that can simplify the distributed input/output (I/O) interface and maximize the execution efficiency of the electronic system by establishing a less burdensome I/O architecture. The interface control mechanism can be configured on-the-fly to process the data used in a user program without utilizing the I/O storage stack structure, or to support the fixed block architecture of the operating system. The execution of the interface control mechanism can be configured at a user program level to provide efficient access to storage devices and provide the maximum program execution efficiency.

Various embodiments provide an interface control mechanism for large databases by allowing large transfers outside the customary I/O storage stacks or standard fixed block transfers provided by operating system architectures. The interface control mechanism also allows manipulation of the data based on a key value assigned to the data or a logical block address. The data management mechanism can operate in a host central processing unit (CPU) system memory, without making I/O calls through the operating system. The execution of the interface control mechanism from the user defined space of the system memory can provide higher priority operation, while managing the operational characteristics of a key value storage device. The electronic system can also support the fixed block architecture prevalent in today's operating systems. This combination can increase the efficiency and operational performance of the data management mechanism.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims section below, the modules are deemed to include hardware circuitry for the purposes and the scope of apparatus claims.

The term "unit" referred to herein is a circuit formed of hardware components or hardware state machines used for specific functions. The "unit" can be for timing critical functions and does not necessarily include software functions or support. The term "customary I/O storage stacks" referred to herein are memory segments within the host system memory that are used to hold address pointers and interrupt flags for input/output (I/O) operations performed by the operating system. The customary I/O storage stacks insert a latency to the I/O in order to load the memory with interrupt pointers to service the transfer of data to or from the I/O device based on servicing the interrupt associated with the transfer of a fixed size block of data.

The data solutions that require a key-value storage solution can have a difficult time to identify useable storage devices that support the improved storage technique. Another difficulty is that storage devices that support the key-value command structure cannot be used on legacy systems that only support the logical block address (LBA) architecture. For LBA interface storage devices, there are two issues for supporting key-value commands. First is that two mapping layers are needed. One of the mapping layers to retrieve the value locations (logical block addresses) using a key as an index, and the other mapping layer to retrieve the value using value location information (logical block addresses) prior to issuing block IO requests. The second limitation is that the 2 layer mapping system requires extensive data transfer overhead, but is also compounded by the fact that data transfer units are a fixed sized block (e.g., 512 Bytes or 4 KB), which can cause unnecessary data to be transferred if the data size is not aligned to the block.

Figure 1:
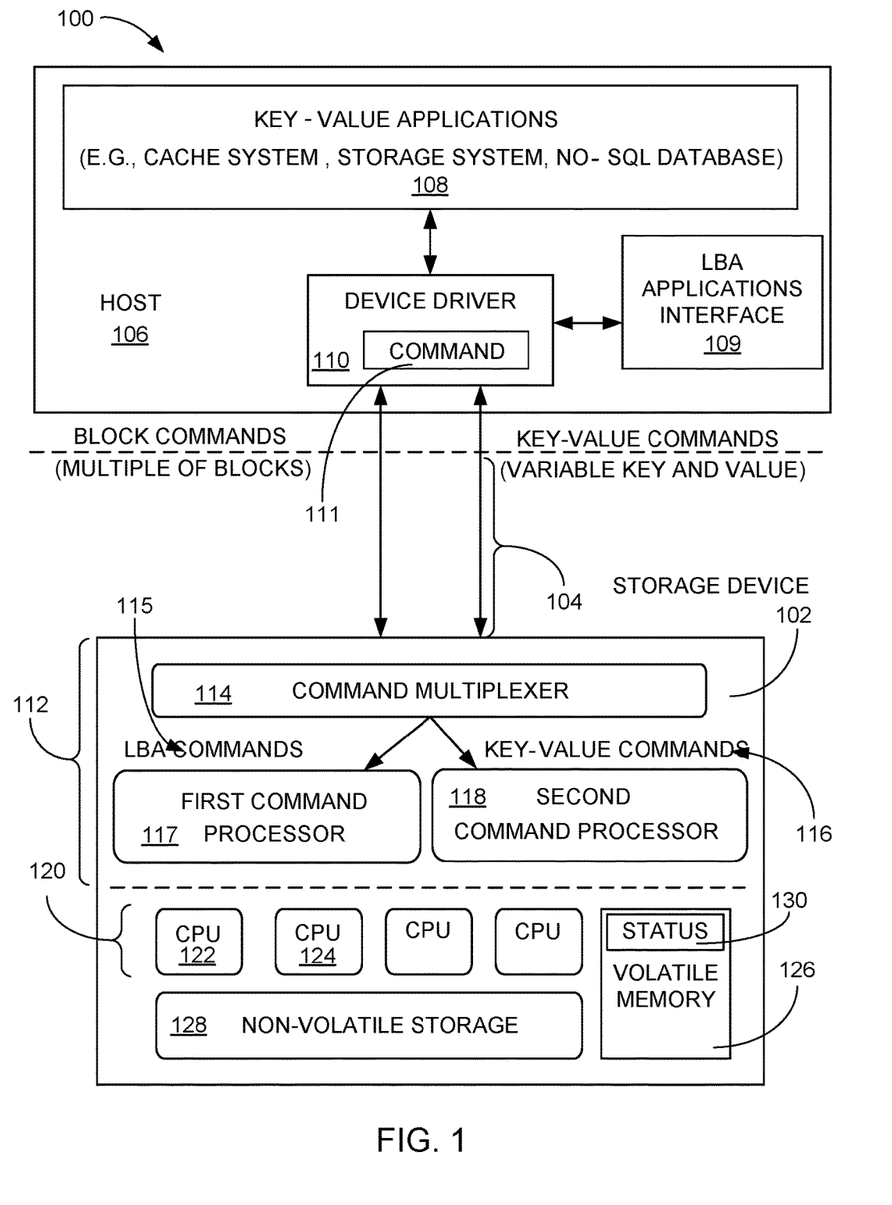
FIG. 1 is an architectural block diagram of an electronic system with interface control mechanism in an embodiment.

Referring now to FIG. 1, therein is shown an architectural block diagram of an electronic system 100 with an interface control mechanism in an embodiment of the present concepts. The electronic system 100 includes a storage device 102, examples of such devices can include solid state storage devices (SSSD) based on Flash memory, magnetic random access memory (MRAM), Resistive Random Access Memory (RRAM), and Phase Change Memory (PCM), as well as hybrid disk storage devices, and key value storage adapters, which are addressed by way of a key value for identifying file structures. The storage device 102 can be a non-volatile data storage mechanism that stores and accesses user data by way of key value addressing or LBA addressing interchangeably. The storage device 102 can be used for data processing in a computing environment for managing large databases as well as normal fixed block transfers from the operating system.

A device coupling structure 104 can link the storage device 102 to a host processor 106. The device coupling structure 104 can be an input/output interface structure connected between the host processor 106 and the storage device 102. The device coupling structure 104 can include a peripheral computer interface express (PCI-e), fiber channel (FC), small computer system interface (SCSI), or serial attached SCSI (SAS), and the host's memory channel interface. The device coupling structure 104 can be implemented as a memory bus for host internal application of the electronic system 100. The device coupling structure 104 can provide local or remote connectivity between the host processor 106 and the storage device 102. The connection of the device coupling structure 104 between the storage device 102 and the host processor 106 is performed in a manner that meets the specification of the device coupling structure 104.

The device coupling structure 104 can provide direct coupling and communication to the storage device 102 for LBA transfers or key-value transfers. It is understood that the communication with LBA transfers requires the I/O calls provided by the operating system and may utilize a logical block address (LBA) architecture. Since the storage device 102 can use the LBA architecture and a key-value based linear storage architecture, the communication from the host processor 106 can be simplified.

The host processor 106 can be a general purpose computer, a computer network, a server, a storage processor, GPU, ASIC, FPGA, PLD, or the like. The host processor 106 can execute a key-value device application program interface (API) 108, an LBA API 109, and a device driver 110.

The key-value device API 108 provides an application interface that allows user applications to access the storage device 102 without including a description of the operational characteristics of the storage device 102. The key-value device API 108 is a program that translates standard Application instructions into a form that is recognized by the device driver 110. The key-value device API 108 passes the application requirements to the device driver 110 for conversion to interface commands 111 that are recognized by the storage device 102. The LBA API 109 can pass the application requirements to the device driver 110 for conversion to interface commands 111 that are recognized by the storage device 102. The device driver 110 can process interface commands 111 that support both the LBA architecture and a key-value based linear storage architecture.

The interface commands 111 can include conditioning commands and data processing commands.

The device driver 110 can communicate through the device coupling structure 104 with a vendor specific version of Non-Volatile Memory Express (NVMe). An embodiment of the storage device 102 can have a default configuration to support the LBA architecture and have the ability to convert some or all of its resources to support the key-value architecture. The device driver 110 can send a conditioning command 111 to the storage device 102 in order to configure hardware and firmware resources to support the LBA architecture, the key-value architecture, or a combination thereof.

The device driver 110 can communicate through the device coupling structure 104 to an interface control unit 112 in the storage device 102. The interface control unit 112 can have a command multiplexer 114, which can detect whether an incoming command is a conditioning command 111, an LBA command 115, or a key-value command 116. The command multiplexer 114 can direct information coming into the interface control unit 112 to a first command processor 117 or a second command processor 118. The storage device 102 can configure the hardware and firmware of the interface control unit 112 in order to support the conditioning command 111 from the device driver 110.

In an embodiment, the interface control unit 112 can be implemented as a module consisting of firmware executing on a processor or as a unit with dedicated hardware for decoding the command structure and passing the decoded command to the first command processor 117 or the second command processor 118. Either implementation can support the utility of the electronic system 100.

It is understood that the first command processor 117 can be any of the command processing unit (CPU) resource that is immediately available in the electronic system 100. On successive command sequences, the first command processor 117 can be a different CPU. It is further understood that the second command processor 118 can be any other available CPU resource that is not executing the firmware of the first command processor 117. In an embodiment, the first command processor 117 can be a single CPU configuration executing firmware to support the LBA command 115, and the second command processor 118 can be the same single CPU executing firmware to support the key-value command 116.

The LBA command 115 can be an operating system standard command, sector based, and can be transported between the host processor 106 and the storage device 102 by a register based command structure consisting of 16 double words (DWORD) (32 bits per DWORD) numbered 0-15. In the LBA command 115, DWORD0 is an operation code and DWORD1 is a system identifier (NSID). In the LBA command 115, DWORDS 2-11 are either reserved or used for general command information. DWORD12 is used to indicate the number of sectors to be processed in the LBA command 115. DWORD13-15 are associated with the key-value command 116. The LBA command 115 can only transfer data by sectors and each sector is counted as a logical block, which is associated with a logical block address.

The key-value command 116 can be a register based command consisting of 16 double words (DWORD) (32 bits per DWORD) numbered 0-15. In the key-value command 116 the DWORD0 is an operation code and the DWORD1 is a system identifier (NSID). In the key-value command 116 the DWORDS 2-14 are either reserved or used for general command information. The DWORD15 content is specific to the size of the key in the key-value command 116. The key-value command 116 can transfer any number of data bytes associated with the key (identifier of the data file).

In an embodiment, the first command processor 117 and the second command processor 118 can have a default configuration to support only the LBA commands 115. The conditioning command from the device driver 110 can cause one of both of the first command processor 117 and the second command processor 118 to be reconfigured to process the key-value command 116. In the event only one of the first command processor 117 or the second command processor 118 is reconfigured to process the key-value command 116, the storage device 102 can be capable of processing the LBA command 115 and the key-value command 116 concurrently.

It is understood that the default configuration of the storage device 102 to only support the LBA commands 115 is only an example. The default configuration of the storage device 102 can also support a mix of the LBA commands 115 and the key-value commands 116 or default to only support the key-value commands 116. The specific default configuration of the storage device 102 is not limited to a single embodiment. It is further understood that the storage device 102 can execute the LBA commands 115 and the key-value commands 116 independently and concurrently because a portion of the resources of the storage device 102 are assigned to only execute the LBA commands 115 and an additional portion of the resources of the storage device 102 are assigned to only execute the key-value commands 116. The storage device 102 can execute both command types concurrently, through dedicated resources, or independently execute one command type of the other.

The first command processor 117 or the second command processor 118 can receive a data processing command 111, such as a read, write, or erase, and assign the actual processing of the command to a central processing unit (CPU) 120, of a plurality of the CPUs 120, which can include a first CPU 122 and a second CPU 124. An embodiment is shown to have four of the CPU 120, but any number is possible. The CPU 120 can be a bit-slice processor, a micro-processor, a programmable state machine, a program sequencer, a micro-computer, or the like. The first command processor 117 or the second command processor 118 can configure a number of the CPU 120 to process the key-value command 116, or the LBA command 115 based on the conditioning command. During the execution of the data processing command each of the CPU 120 can have a specific command type assigned and will only execute that command type, the LBA command 115 or the key-value command 116, until it is reconfigured.

By way of an example, the first CPU 122 can execute the LBA command 115 using a volatile memory 126 as a temporary storage or cache and a non-volatile storage 128 as a long-term storage mechanism for the data being processed. Since the first CPU 122 is configured to execute the LBA command 115, a logical-to-physical table can be maintained in the volatile memory 126 and can be copied to a reserved location in the non-volatile storage 128 prior to power-down. The logical-to-physical table can maintain location pointers for each of the LBA's to a physical location in the non-volatile storage 128 where the data for the LBA is stored.

Concurrently, with the first CPU 122 executing the LBA command 115 by way of the example, the second CPU 124 can execute the key-value command 116. The second CPU 124 can use the volatile memory 126 as the temporary storage or cache and the non-volatile storage 128 as the long-term storage mechanism for the data being processed.

Since the second CPU 124 is configured to execute the key-value command 116, a key-value index list can be maintained in the volatile memory 126 and can be copied to a reserved location in the non-volatile storage 128 prior to power-down. The key-to-physical table can maintain location pointers for each of the keys to a physical location in the non-volatile storage 128 where the data for the value associated with the key is stored.

The non-volatile storage 128 can include Flash memory, magnetic random access memory (MRAM), Resistive Random Access Memory (RRAM), and Phase Change Memory (PCM), as well as hybrid disk storage devices, and key value storage adapters. It is understood that while the non-volatile storage 128 is shown to be physically on the storage device 102 that this is only an embodiment and other embodiments are possible. In an embodiment, the non-volatile storage 128 can be network or cable attached storage devices and the plurality of the CPU 120 can generate subsequent commands in order to store the data from the LBA command 115 or the key-value command 116.

Upon completion of the LBA command 115 or the key-value command 116, a detailed status 130 can be compiled in the volatile memory 126 by the first CPU 122 or the second CPU 124 that completed the interface command 111. The detailed status 130 can be sent, through the device coupling structure 104 to the device driver 110, by the first command processor 117 or the second command processor 118 that assigned the interface command 111 to the one of the plurality of the CPU's 120.

It has been discovered that the electronic system 100 can enhance performance of the host processor 106 by allowing execution of both the LBA command 115 and the key-value command 116 concurrently in the storage device 102. The first command processor 117 and the second command processor 118 can configure the plurality of the CPUs 120 to maintain the key-value index list, the logical-to-physical table, or a combination thereof that can accommodate read/write access of the storage device 102.

Figure 2:
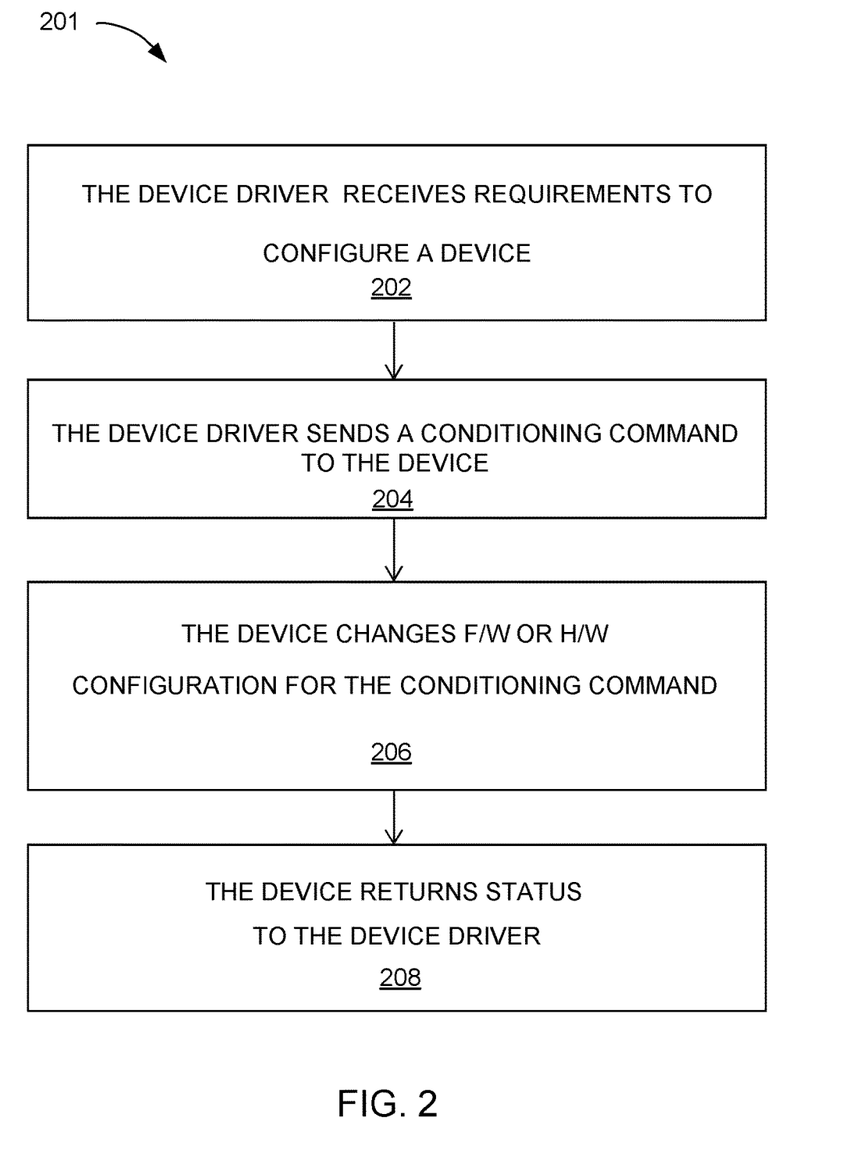
FIG. 2 is a flow chart of a conditioning command of a store device in an embodiment.

Referring now to FIG. 2, therein is shown a flow chart of a conditioning command 201 of a store device in an embodiment. The flow chart of the conditioning command 201 depicts a process by which the device driver receives requirements to configure a device in a block 202. The device driver 110 of FIG. 1 can be instructed by the key-value device API 108 of FIG. 1 and the LBA API 109 of FIG. 1 to configure the storage device 102 of FIG. 1 in order to support the requirements of the host processor 106 of FIG. 1.

The host processor 106 can support a mix of the LBA commands 115 of FIG. 1 and the key-value commands 116 of FIG. 1 on the storage device 102. The requirements can be loaded in the device driver 110 for communication to the storage device 102. This can be executed by the device driver, which sends the conditioning command to the device in a block 204. The device driver 110 can send the conditioning command 111 through the device coupling structure 104 of FIG. 1 to the interface control unit 112 of FIG. 1 for execution.

The device changes firmware or hardware configuration responsive to the conditioning command in a block 206. The first command processor 117 of FIG. 1 can receive the conditioning command 111 and make any configuration changes to firmware, hardware, or the combination thereof in order to satisfy the conditioning command 111. The first command processor 117 can configure the first CPU 122 of FIG. 1 to assist in the reconfiguration of the storage device 102. The reconfiguration of the storage device 102 can include mapping different firmware for the plurality of the CPU's 120 and configuring hardware to segregate memory pointers between the LBA commands 115 and the key-value commands 116.

It is understood that additional conditioning commands can subsequently occur when a different configuration is required and the hardware and firmware configuration change can be made. The conditioning command can configure a mix of the support for the LBA commands 115 and the key-value commands 116 in any ratio of the plurality of the CPU's 120 required by the current system activity.

Upon completion of the reconfiguration, the device returns its status to the device driver in a block 208. The first CPU 122 can prepare the detailed status 130 of FIG. 1 in the volatile memory 126 indicating the success or failure of each of the configuration changes required by the conditioning command 111. The first command processor 117 can transfer the detailed status 130 through the device coupling structure 104 to the device driver 110 for responding to the host processor 106.

It has been discovered that an embodiment of the storage device 102 can reduce the congestion on the device coupling structure 104 by handling the configuration of the storage device in a single conditioning command 111. The storage device 102 can be configured to support a mix of the LBA commands 115 and the key-value commands 116 in any ratio.

Figure 3:
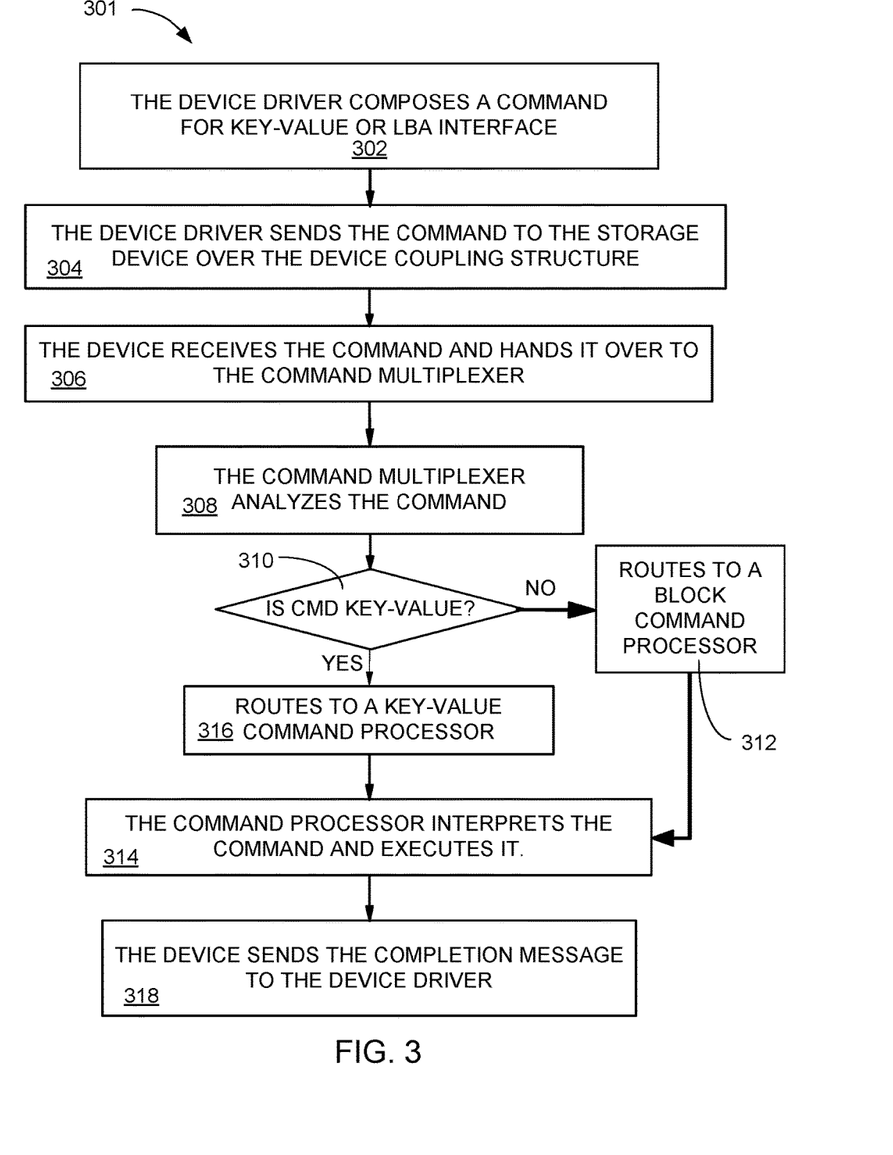
FIG. 3 is a flow chart of command interpretation by an electronic system in an embodiment.

Referring now to FIG. 3, therein is shown a flow chart of command interpretation 301 by an electronic system 100 in an embodiment. The flow chart of the command interpretation 301 depicts the device driver composing a command for the mixed key-value/LBA interface in a block 302. The device driver 110 of FIG. 1 can compose the data processing commands 111 of FIG. 1 including a "GET", as a read command, a "PUT", as a write command, and a "DELETE", as a write. By using the format of the NVMe register command set. Both the LBA commands 115 and the key-value commands 116 can be mapped to the same command format.

The flow proceeds to a block 304, in which the device driver 110 sends the command 111 to the storage device 102 over the device coupling structure 104. The interface command 111 can be the conditioning command or the data processing commands. By mapping both the LBA commands 115 and the key-value commands 116 to the interface commands 111, the electronic system 100 of FIG. 1 can transfer the actual byte count of the interface command 111, without being limited to the 512 byte or 4K byte limits of the LBA commands 115.

The flow proceeds to a block 306, in which the storage device 102 receives the interface command 111 and hands it over to the command multiplexer 114 of FIG. 1. The interface circuit 112 of FIG. 1 can receive the interface command 111 and process the transfer protocol associated with the device coupling structure 104.

The flow proceeds to a block 308, in which the command multiplexer 114 analyzes the interface command 111. The command multiplexer 114 can parse the format of the interface command 111 in order to determine whether the interface command 111 is a conditioning command 111, the LBA command 115, or the key-value command 116. The command multiplexer 114 can key the decision between the LBA command 115, or the key-value command 116 based on the content of a lower 16 bits of DWORD12 in the NVMe format, which contains a sector count for the LBA command 115. In the event DWORD12 contains zeroes, the command multiplexer 114 can examine DWORD15 in the NVMe format which contains the "key" size in bytes to identify the key-value command 116. If both the DWORD12 and DWORD15 contain zeroes, the interface command 111 can be identified as the conditioning command 111.

The flow proceeds to a block 310, in which the command multiplexer 114 determines whether the interface command 111 is the key-value command 116. If the interface command 111 is not the key-value command 116, the flow proceeds to a block 312, in which the command multiplexer 114 routes to a block command processor, such as the first command processor 117. The first command processor 117 can further analyze the interface command 111 to extract the requirements of the command and set-up the volatile memory 126 of FIG. 1 with the information required to execute the interface command 111. The flow then proceeds to a block 314.

If in the block 310 the interface command 111 is determined to be the key-value command 116, the flow proceeds to a block 316, in which the command multiplexer 114 routes to the key-value command processor, such as the second command processor 118. The second command processor 118 can further analyze the interface command 111 to extract the requirements of the command and set-up the volatile memory 126 of FIG. 1 with the information required to execute the interface command 111. The flow then proceeds to a block 314.

It is understood that in a single processor environment of the electronic system 100, the block 310 can be a branch in the firmware to an execution string that can execute the preparation for the LBA command or the key value command. The preparation of the command execution can configure transfer byte counts, data destination, and status preparation prior to actually executing the data transfer and clean-up from the command. The flow would proceed to the block 314 in order to execute the command previously set-up in the block 312 or the block 316. The rest of the command execution proceeds as normal.

In the block 314, the first command processor 117 or the second command processor 118 can identify one of the plurality of the CPU 120 to execute the interface command 111. By way of an example, if the first command processor 117 determines that the interface command is the conditioning command 111 or the LBA command 115, then the first CPU 122 can be selected to execute the interface command. If on the other hand, the second command processor detects that the interface command 111 is the key-value command 116, the second CPU 124 can be selected to execute the interface command 111.

The one of the plurality of the CPU's 120 that is selected can be configured to retrieve information from the volatile memory 126 in order to execute the interface command 111. If additional interface exchanges are required, such as for data transfer, the selected one of the plurality of the CPU's 120 can enable the first command processor 117 or the second command processor 118 that selected it to perform the data transfer. The selected one of the plurality of the CPU's 120 can transfer the data between the volatile memory 126 and the non-volatile storage 128 as is appropriate for the execution of the interface command 111. That is, read commands 111 will transfer the data from the non-volatile storage 128 to the volatile memory 126 prior to enabling the first command processor 117 or the second command processor 118 that selected it to perform the data transfer. In the case of write commands 111, the data can be transferred to the volatile memory 126 prior to transferring to the non-volatile memory 128. In either case the data can be maintained in the volatile memory 126 as a cache, as appropriate for the set-up of the storage device 102.

The flow then proceeds to a block 318, in which the storage device 102 sends a completion message to the device driver 110. The selected one of the CPU's 120, upon completion of the interface command 111, can determine the detailed status 130, set-up a completion message in the volatile memory 126, and enable the first command processor 117 or the second command processor 118 that selected it to send the detailed status 130 of FIG. 1 to the device driver 110. In case of an error, the error details can be transferred as part of the detailed status 130.

It has been discovered that the electronic system 100 can reduce the latency of the transfer of the user data 306 by utilizing the plurality of the CPU's 120 to execute the interface commands 111, while the initial analysis and parsing is performed by the first command processor 117 for the LBA commands 115 and the second command processor 118 for the key-value commands 116. The NVMe command format can handle both the LBA commands 115 and the key-value commands 116 with equal efficiency and the ability to perform the conditioning command 111 on-the-fly allows the host processor 106 of FIG. 1 the ability to customize the amount of resource applied to each of the LBA commands 115 and the key-value commands 116.

Figure 4:
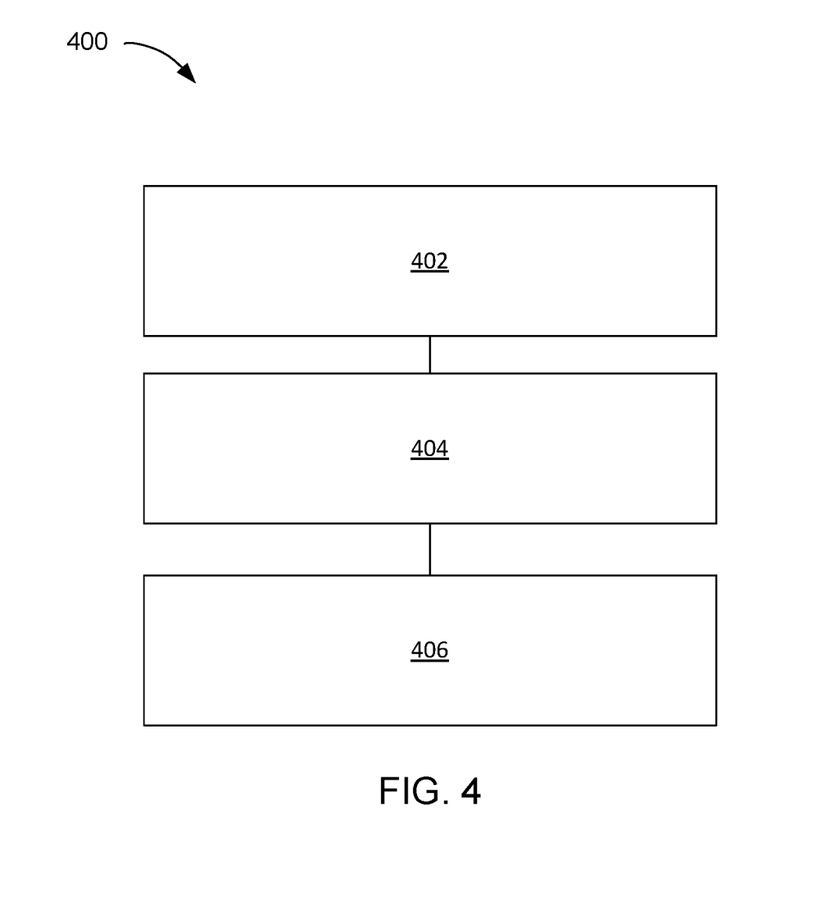
FIG. 4 is a flow chart of a method of operation of an electronic system in a further embodiment of the present invention.

Referring now to FIG. 4, therein is shown a flow chart of a method 400 of operation of an electronic system 100 in a further embodiment of the present invention. The method 400 includes: receiving an interface command 111 by a storage device 102 including: analyzing the interface command 111 in an interface control unit 112 by examining the content of the DWORD15 of the interface command 111, selecting a first CPU 122 for executing a logical block address LBA command 115 if the DWORD15 is equal to zero, selecting a second CPU 124 for executing a key-value command 116 if the DWORD15 is not equal to zero, and processing the LBA command 115 and the key-value command 116 independently and concurrently for accessing a non-volatile storage 128 in a block 402; compiling a detailed status 130, by the first CPU 122 or the second CPU 124, after completing the LBA command 115 or the key-value command 116 in a block 404; and responding to the interface command 111 by sending the detailed status 130, through a device coupling structure 104, to a device driver 110 in a block 406.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. An electronic system comprising:
a storage device, configured to receive an interface command including:
an interface control unit,
a first CPU, coupled to the interface control unit, configured to execute a logical block address (LBA) command,
a second CPU, coupled to the interface control unit, configured to execute a key-value command, and
a non-volatile storage, coupled to a volatile memory, the first CPU, and the second CPU, configured to process the LBA command and the key-value command independently and concurrently;
wherein:
the first CPU or the second CPU are configured to compile a detailed status after completing the LBA command or the key-value command; and
the interface control unit, connected to a device coupling structure, is configured to respond to the interface command by sending the detailed status to a device driver.

2. The system as claimed in claim 1 wherein the interface control unit includes a first command processor is configured to analyze the LBA command.

3. The system as claimed in claim 1 wherein the interface control unit includes a second command processor is configured to analyze the key-value command.

4. The system as claimed in claim 1 wherein the interface control unit includes a first command processor which is configured to analyze a conditioning command.

5. The system as claimed in claim 1 further comprising a command multiplexer, which is configured to analyze the interface command and route to a first command processor or a second command processor based on a DWORD15 of the interface command.

6. The system as claimed in claim 1 further comprising a volatile memory, accessed by the first CPU configured to execute the LBA command.

7. The system as claimed in claim 1 further comprising a volatile memory, accessed by the second CPU configured to execute the key-value command.

8. The system as claimed in claim 1 wherein the interface control unit is configured to analyze the interface command in order to select the first CPU from a plurality of CPU's.

9. The system as claimed in claim 1 further comprising a first command processor which is configured to execute a conditioning command, and reconfigure a one or more of the CPUs to execute the LBA command, the key-value command, or a combination thereof.

10. The system as claimed in claim 1 wherein the interface circuit is configured to accept the interface command generated by the device driver in response to a key-value application program interface (API) or an LBA API loaded in a host processor.

11. A method of operation of an electronic system comprising:
receiving an interface command by a storage device including:
analyzing the interface command in an interface control unit,
selecting a first CPU for executing a logical block address (LBA) command,
selecting a second CPU for executing a key-value command, and
processing the LBA command and the key-value command independently and concurrently for accessing a non-volatile storage;
compiling a detailed status, by the first CPU or the second CPU, after completing the LBA command or the key-value command; and
responding to the interface command by sending the detailed status, through a device coupling structure, to a device driver.

12. The method as claimed in claim 11 further comprising identifying the LBA command including analyzing the interface command by a first command processor selected by a command multiplexer.

13. The method as claimed in claim 11 further comprising identifying the key-value command including analyzing the interface command by a second command processor selected by the command multiplexer.

14. The method as claimed in claim 11 further comprising identifying a conditioning command including analyzing the interface command by a first command processor selected by the command multiplexer.

15. The method as claimed in claim 11 further comprising analyzing the interface command and routing to a first command processor or a second command processor based on a DWORD15 of the interface command.

16. The method as claimed in claim 11 further comprising accessing a volatile memory by the first CPU configured for executing the LBA command.

17. The method as claimed in claim 11 further comprising accessing a volatile memory by the second CPU configured for executing the key-value command.

18. The method as claimed in claim 11 further comprising analyzing the interface command for selecting the first CPU from a plurality of CPU's.

19. The method as claimed in claim 11 further comprising executing a conditioning command including reconfiguring one or more CPUs to execute the LBA command, the key-value command, or a combination thereof.

20. The method as claimed in claim 11 further comprising accepting the interface command generated by the device driver in response to a key-value application program interface (API) or an LBA API loaded in a host processor.

* * * * *